(12) United States Patent
Eck et al.

(10) Patent No.: US 9,086,039 B2
(45) Date of Patent: Jul. 21, 2015

(54) FUEL DELIVERY UNIT

(75) Inventors: Karl Eck, Frankfurt (DE); Dieter Hagist, Lahnstein (DE); Matthias Kadler, Gross-Gerau (DE); Martin Maasz, Sulzbach (DE); Oliver Schönert, Arnsberg (DE); Michael Teichert, Schwalbach (DE)

(73) Assignee: Continental Automotive GmbH, Hannover (DE)

( * ) Notice: Subject to any disclaimer, the term of this patent is extended or adjusted under 35 U.S.C. 154(b) by 718 days.

(21) Appl. No.: 12/373,289

(22) PCT Filed: Jul. 9, 2007

(86) PCT No.: PCT/EP2007/056993
§ 371 (c)(1),
(2), (4) Date: Feb. 19, 2009

(87) PCT Pub. No.: WO2008/006810
PCT Pub. Date: Jan. 17, 2008

(65) Prior Publication Data
US 2009/0277509 A1    Nov. 12, 2009

(30) Foreign Application Priority Data
Jul. 11, 2006    (DE) .......................... 10 2006 032 100

(51) Int. Cl.
| F02M 37/04 | (2006.01) |
| B60K 15/077 | (2006.01) |
| F02M 37/10 | (2006.01) |
| B60K 15/03 | (2006.01) |
| F02M 37/22 | (2006.01) |

(52) U.S. Cl.
CPC ............ *F02M 37/106* (2013.01); *B60K 15/077* (2013.01); *B60K 2015/03105* (2013.01); *B60K 2015/03111* (2013.01); *B60K 2015/03236* (2013.01); *F02M 2037/228* (2013.01)

(58) Field of Classification Search
CPC .......... F02M 2037/228; F02M 37/106; F02M 37/04; F02M 37/0088; B60K 2015/03105; B60K 2015/03236; B60K 15/077; B60K 2015/03111; B60K 15/06; B60K 2015/03118; D06F 39/006
USPC ............ 137/545, 550, 571, 576, 575, 565.34; 123/510; 285/3, 4
See application file for complete search history.

(56) References Cited

U.S. PATENT DOCUMENTS 4,846,506 A * 7/1989 Bocson et al. ................ 285/4
5,341,842 A * 8/1994 Chih et al. .................... 137/574
(Continued)

FOREIGN PATENT DOCUMENTS

| CN | 1365428 A | 8/2002 |
| DE | 10004357 A1 | 8/2001 |

(Continued)

*Primary Examiner* — Melanie Tyson
*Assistant Examiner* — Chee-Chong Lee
(74) *Attorney, Agent, or Firm* — Cozen O'Connor

(57) ABSTRACT

A fuel delivery unit of a motor vehicle comprises a prefilter arranged inside a swirl pot, said prefilter having a filter element, and at least one connection piece for connecting a supplementary filter element. The at least one connection piece, in its initial condition, is closed, and is opened when the supplementary filter element is attached. The invention allows the fuel delivery unit to be adapted to projected filter surfaces of the prefilter.

9 Claims, 2 Drawing Sheets

(56) References Cited

U.S. PATENT DOCUMENTS

| | | |
|---|---|---|
| 5,415,146 A | 5/1995 | Tuckey |
| 5,584,988 A | 12/1996 | Hashimoto |
| 6,412,517 B1 * | 7/2002 | Flambert et al. ............... 137/550 |
| 6,551,509 B2 | 4/2003 | Appleton |
| 7,182,869 B2 | 2/2007 | Catlin et al. |
| 7,279,095 B2 | 10/2007 | Usui et al. |
| 2002/0153300 A1 | 10/2002 | Appleton |

FOREIGN PATENT DOCUMENTS

| | | |
|---|---|---|
| DE | 69815871 | 5/2004 |
| DE | 102005018808 A1 | 11/2005 |
| EP | 1 553 285 | 7/2005 |
| EP | 1553285 A1 | 7/2005 |
| FR | 2 768 777 | 3/1999 |
| FR | 2 876 420 | 4/2006 |
| JP | 2003-521632 A | 7/2003 |
| WO | WO 01/57387 | 8/2001 |

* cited by examiner

FUEL DELIVERY UNIT

CROSS REFERENCE TO RELATED APPLICATIONS

This is a U.S. national stage of application No. PCT/EP2007/056993, filed on 9 Jul. 2007, priority is claimed on Application No. 10 2006 032 100.6, filed 11 Jul. 2006, the contents both of which are incorporated here by reference.

BACKGROUND OF THE INVENTION

1. Field of the Invention

The invention relates to a fuel delivery unit of a motor vehicle, with a swirl pot and with a prefilter which has a filter element and is intended for filtering the fuel flowing into the swirl pot.

2. Description of the Prior Art

Delivery units with swirl pots of this type are frequently used in motor vehicles nowadays and are known from practice. In the case of the known delivery units, the swirl pot is connected to the filter element of the prefilter. If an appropriately sized filter capacity of the prefilter is to be ensured, an appropriately sized filter element of the prefilter is used. A disadvantage of the known fuel delivery unit is that it is highly cost-intensive to keep different filter elements in stock.

SUMMARY OF THE INVENTION

The invention is based on the problem of developing a fuel delivery unit of the type mentioned at the beginning in such a manner that it can be adapted particularly cost-effectively to designated filter capacities.

This problem is solved according to one embodiment of the invention in that the prefilter has a support with at least one connection piece, which is closed in the basic state, for the installation of an additional filter element.

By means of this configuration, the fuel delivery unit according to one embodiment of the invention can be equipped with the additional filter element as well as with the filter element. The filter element preferably has a sufficient filter surface for most applications. If a particularly large filter capacity of the prefilter is to be ensured, the additional filter element can be fitted on the connection piece. Therefore, the fuel delivery unit according to the invention can be adapted particularly cost-effectively to the designated filter capacity.

The fuel delivery unit according to one embodiment of the invention is particularly compact if the support and a base plate closing the swirl pot delimit a collecting chamber for collecting the prefiltered fuel, if an intake connection of a fuel pump is connected to the collecting chamber, and if the connection piece protrudes into the interior of the swirl pot.

The support in one embodiment a closed wall with a plurality of connection pieces. In this case, the filter element is designed as the additional filter element and could be fitted on one of the connection pieces. The fuel delivery unit according to this embodiment of the invention is particularly compact if the filter element is designed as a partial region of the support. By means of this configuration, the swirl pot has at least the filter element which is designed as a partial region of the support. If the filter surface is to be enlarged, one or more other additional filter elements is or are fitted to the corresponding connection piece or connection pieces.

According to another embodiment of the invention, the prefilter has a particularly large filter surface if the filter element is adjacent to the at least one connection piece.

According to another embodiment of the invention, the installation of the prefilter turns out to be particularly simple if the filter element is connected to the swirl pot and/or to the support with a cohesive material joint. By means of this configuration, the swirl pot, in the basic state, has at least a single filter element and, if the need arises, can be provided with a particularly large surface area by the installation of the additional filter element on the connection piece.

The additional filter element to be fitted to the connection piece turns out to be particularly compact, according to another embodiment of the invention, on the additional filter element provided for installation on the connection piece has a connector and a filter fabric protruding from the connector, and if the filter fabric is of bag-shaped design. The bag-shaped filter fabric can be produced, for example, from a tubular filter fabric by the connector being connected to one end of the tubular filter fabric and the other end being closed.

According to another embodiment of the invention, the prefilter which is fitted on the support has a high degree of stability if the connection piece surrounds the connector of the attached additional filter element. Furthermore, the connector of the additional filter element is capable of sealing the opened connection piece.

The installation of the additional filter element is simplified, according to another embodiment of the invention, if the connection piece protrudes in the shape of a tube from the support, and if the support has an at least partially encircling groove as a predetermined breaking point within the connection piece. By means of this configuration, the additional filter element is pressed, upon installation, into the connection piece until the connector can break open the support at the encircling groove. Subsequently, the connector of the additional filter element is inserted in the connection piece and seals the latter. The connector preferably has an end edge for breaking open the predetermined breaking point. The additional filter element can therefore be fitted without a tool.

BRIEF DESCRIPTION OF THE DRAWINGS

The invention permits numerous embodiments. To further clarify its basic principle, one of said embodiments is illustrated in the drawing and is described below. In the drawing

DETAILED DESCRIPTION OF THE PREFERRED EMBODIMENTS

Figure 1:
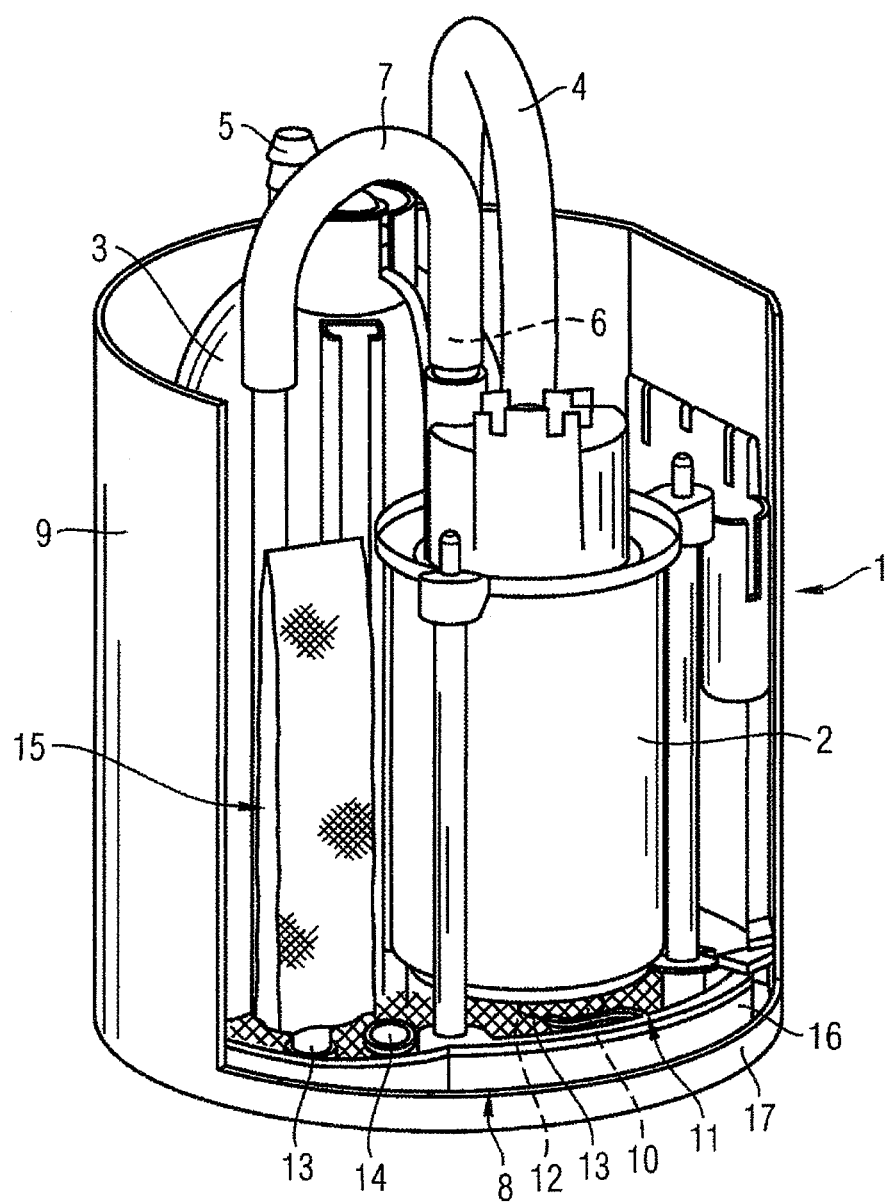
FIG. 1 is a partial section through a fuel delivery unit according to the invention.

FIG. 1 shows a delivery unit which is to be arranged in a fuel tank (not illustrated) of a motor vehicle and is intended for delivering fuel to an internal combustion engine (likewise not illustrated) of the motor vehicle. The delivery unit has a fuel pump 2 which is arranged in a swirl pot 1 and is driven by an electric motor, and a fine filter 3. The fine filter 3 is likewise arranged in the swirl pot 1 and is connected to the fuel pump 2 via a fuel line 4. Furthermore, the fine filter 3 has a feed connection 5 for a feed line leading to the internal combustion engine of the fuel tank. A line 7 for a suction jet pump (not illustrated) is connected to a connection 6 of the fuel pump 2. The suction jet pump sucks up fuel from the surroundings of the swirl pot 1 and delivers said fuel into the swirl pot 1. The swirl pot 1 serves to collect the fuel and has a base plate 8 and a casing 9 connected to the base plate 8 in a sealing manner. An intake connection 10 of the fuel pump 2 protrudes through a prefilter 11 into a collecting chamber 12 arranged between the base plate 8 and the prefilter 11. The prefilter 11 has a planar filter element 19 which is connected to the casing 9 of the swirl pot 1 with a cohesive material joint and in a sealing manner
and has two connection pieces 13, 14. An additional filter element 15 is connected to one of the connection pieces 13 while the other connection piece 14 is sealed.

Fuel flowing into the swirl pot 1 passes via the prefilter 11 into the collecting chamber 12 and therefore to the intake connection 10 of the fuel pump 2. The fuel pump 2 is therefore capable of sucking up prefiltered fuel from the swirl pot 1 and of delivering said fuel via the fine filter 3 to the feed connection 5 for the feed line. The casing 9 of the swirl pot 1 has an edge 17 which engages over a supporting edge 16 of the base plate 8. The edge 17 and the supporting edge 16 are connected to each other in a sealing manner.

Figure 2:
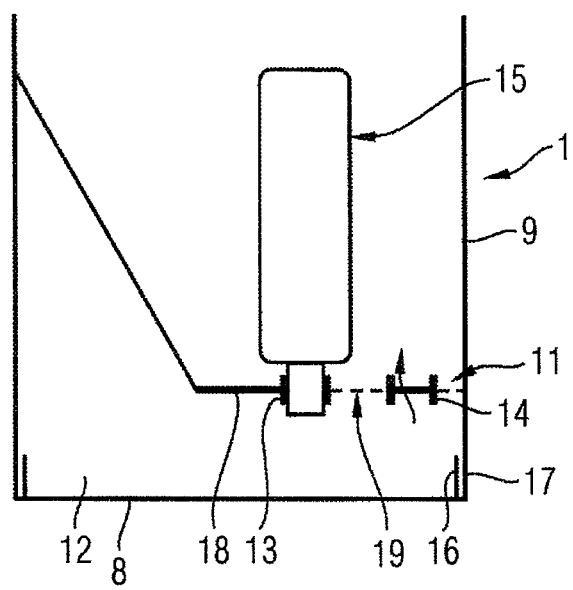
FIG. 2 is schematically a longitudinal section through a swirl pot with a prefilter of the fuel delivery unit according to the invention from FIG. 1.

FIG. 2 shows schematically a sectional illustration through the swirl pot 1 with the prefilter 11 from FIG. 1. To simplify the drawing, other components, such as the fuel pump 2 and the fine filter 3, are not illustrated in FIG. 2. The prefilter 11 has a support 18 for holding the connection pieces 13, 14 and holds the planar filter element 19 and the additional filter element 15. Furthermore, the support 18 with the filter element 19 and the additional filter element 15 together with the base plate 8 delimit the collecting chamber 12.

Figure 3:
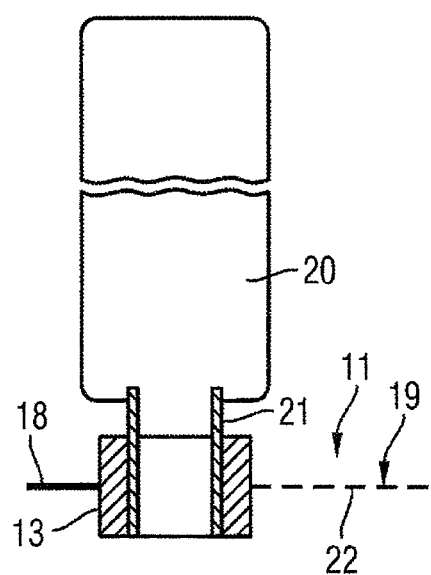
FIG. 3 is a greatly enlarged illustration of a partial region of the prefilter from FIG. 2 in the region of an additional filter.

FIG. 3 shows, on a greatly enlarged scale, the additional filter element 15 attached in one of the connection pieces 13 of the prefilter 11. The additional filter element 15 has a bag-shaped filter fabric 20 with a connector 21 which is plugged into one of the connection pieces 13 of the support 18. The connection piece 13 of the support 18 therefore surrounds the connector 21 of the additional filter element 15. A filter fabric 22 of the filter element 19 arranged on the support 18 is adjacent to the connection piece 13.

Figure 4:
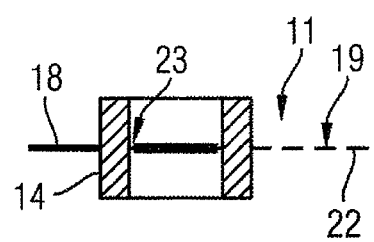
FIG. 4 is a greatly enlarged illustration of a partial region of the prefilter from FIG. 2 in the region of a closed connection piece.

FIG. 4 shows the sealed connection piece 14 with adjacent regions of the prefilter 11.

In order to enlarge the filter surface of the prefilter 11, an additional filter element 15 like the one illustrated in FIG. 3 can likewise be attached to said connection piece 14. The connection piece 14 has an encircling groove 23 as a predetermined breaking point. When the additional filter element 15 is attached, the encircling groove 23 is broken open. The additional filter element 15 is therefore held on the connection piece 13 in a sealed manner, as illustrated in FIG. 3.

In the basic state after the manufacturing of the prefilter 11, the connection pieces 13, 14, as per the one from FIG. 4, are sealed. The prefilter 11 therefore exclusively has the filter surface formed by the filter fabric 22 of the planar filter element 19. If the prefilter 11 is to be provided with an enlarged filter surface, the additional filter element 15 is attached to one or to both connection pieces 13, 14. The filter surface can therefore be adapted with a large number of identical parts in a manner corresponding to the number of connection pieces 13, 14 provided on the support 18.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fuel delivery unit of a motor vehicle, comprising:
a swirl pot;
an internal prefilter arranged entirely in the swirl pot and having a filter element having a first filter surface configured to filter fuel flowing into the swirl pot;
an additional filter having an additional filter element; and
a support for the prefilter having at least one connection, which is closed in an initial state by a one-time breakable seal, configured for installation of the additional filter having a second filter surface such that fuel flows through the additional filter and through the at least one connection,
whereby the installation of the additional filter in the swirl pot breaks the one-time breakable seal and increases filter capacity by providing an increased active filter surface so that the prefilter and the additional filter are wholly fluidically in parallel such that the fuel passes through one of the internal prefilter and the additional filter to simultaneously filter the fuel.

2. The fuel delivery unit according to claim 1, further comprising:
a fuel pump; and
a base plate,
wherein the support and the base plate are configured to close the swirl pot and define a collecting chamber configured to collect prefiltered fuel, an intake connection of the fuel pump is connected to the collecting chamber, and the at least one connection piece protrudes into an interior of the swirl pot.

3. The fuel delivery unit according to claim 2, wherein the filter element is connected to at least one of the swirl pot and the support with a cohesive material joint.

4. The fuel delivery unit according to claim 2, wherein the filter element having the first filter surface is configured as a portion of the support.

5. The fuel delivery unit according to claim 1, wherein the filter element is configured as a portion of the support.

6. The fuel delivery unit according to claim 1, wherein the filter element is adjacent to the at least one connection piece.

7. The fuel delivery unit according to claim 1, wherein the additional filter comprises a connector and a bag-shaped filter fabric extending from the connector configured for connection to the at least one connection piece.

8. The fuel delivery unit according to claim 7, wherein the at least one connection piece is configured to surround the connector of the attached additional filter element when the additional filter element is installed in the at least one connection piece.

9. A fuel delivery unit of a motor vehicle, comprising:
a swirl pot;
an internal prefilter arranged entirely in the swirl pot having a filter element having a first filter surface configured to filter fuel flowing into the swirl pot; and a support for the prefilter having at least one connection piece, which is closed in an initial state by a one-time breakable seal upon installation of an additional filter element having a second filter surface, wherein the at least one connection piece protrudes in the shape of a tube from the support, the support having a groove at least partially encircling the support and configured as a predetermined breaking point of the at least one connection piece to form the one-time breakable seal, whereby the installation of the additional filter element in the swirl pot breaks the one-time breakable seal and increases filter capacity by providing an increased active filter surface so that the prefilter and the additional filter are wholly fluidically in parallel such that the fuel passes through one of the internal prefilter and the additional filter to simultaneously filter the fuel.

* * * * *